US008735713B2

(12) United States Patent
Sie et al.

(10) Patent No.: US 8,735,713 B2
(45) Date of Patent: May 27, 2014

(54) SUN-CHASING DEVICE

(75) Inventors: You-Long Sie, Hsinchu (TW); Edward Yi Chang, Hsinchu (TW); Shyr-Long Jeng, Hsinchu (TW); Wei-Hua Chieng, Hsinchu (TW); Bin-Han Lue, Hsinchu (TW); Ming-Tsan Peng, Hsinchu (TW); Chia-Hua Chang, Hsinchu (TW); Jwu-Shen Hu, Hsinchu (TW); Chien-Hsun Chiang, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 71 days.

(21) Appl. No.: 13/599,086

(22) Filed: Aug. 30, 2012

(65) Prior Publication Data
US 2013/0306829 A1    Nov. 21, 2013

(30) Foreign Application Priority Data

May 15, 2012    (TW) .............................. 101117188 A

(51) Int. Cl.
*F24J 2/52*    (2006.01)
*F24J 2/54*    (2006.01)

(52) U.S. Cl.
CPC .................................. *F24J 2/5431* (2013.01);
*F24J 2002/5479* (2013.01)
USPC ......................................... 136/246; 126/600

(58) Field of Classification Search
CPC ................. H01L 31/0422; F24J 2/5431; F24J 2002/5472; F24J 2002/5451; F24J 2002/5479; F24J 2002/5475; F24J 2002/5465; G01S 3/7861
USPC .............. 248/550, 122.1, 137, 138, 398, 371, 248/432, 454, 181.1, 298.1, 279.1; 136/246, 243–245; 250/203.4; 126/600, 605; 108/1–8; 343/763, 766, 343/765; 52/173.3; 403/53, 57–58, 403/116–117
See application file for complete search history.

(56) References Cited

U.S. PATENT DOCUMENTS

| | | | |
|---|---|---|---|
| 4,063,543 A | * | 12/1977 | Hedger .......................... 126/579 |
| 4,283,588 A | * | 8/1981 | Zitzelsberger ................. 136/246 |
| 4,295,621 A | * | 10/1981 | Siryj ........................... 248/183.2 |

(Continued)

FOREIGN PATENT DOCUMENTS

| TW | M346679 | 12/2008 |
|---|---|---|
| TW | I340226 | 4/2011 |

OTHER PUBLICATIONS

Sie et al., "Design and Simulation of Parallel Manipulator in the Two-axis Sun-tracking Mechanism", Ta Hwa Institute of Technology, Hsinchu, TW (2011).

*Primary Examiner* — Terrell McKinnon
*Assistant Examiner* — Ingrid M Weinhold
(74) *Attorney, Agent, or Firm* — Edwards Wildman Palmer LLP; Peter F. Corless; Steven M. Jensen

(57) ABSTRACT

A sun-chasing device is provided, including a base, a first transmitter disposed on the base, a second transmitter, a support, a carrier pivotally connected to the support for carrying a solar module, a first supporting component pivotally connected to the first transmitter and the carrier, and a second supporting component pivotally connected to the second transmitter and the carrier. The sun-chasing device has great rigidity and carrying ability against strong wind, and has great precision and rotation angle, such that a solar plate can precisely aim at sun for long time and thus the efficiency of a solar module is significantly increased.

7 Claims, 4 Drawing Sheets

(56) References Cited

U.S. PATENT DOCUMENTS

| | | | |
|---|---|---|---|
| 5,820,478 A * | 10/1998 | Wood et al. | 473/279 |
| 5,944,615 A * | 8/1999 | Lee | 473/279 |
| 6,005,236 A | 12/1999 | Phelan et al. | |
| 6,663,498 B2 * | 12/2003 | Stipan | 473/279 |
| 6,960,717 B2 * | 11/2005 | Stuart et al. | 136/246 |
| 8,469,022 B2 * | 6/2013 | Cowan et al. | 126/605 |
| 2009/0050191 A1 * | 2/2009 | Young et al. | 136/246 |
| 2009/0301466 A1 * | 12/2009 | Humanes Asensio et al. | 126/600 |
| 2010/0185333 A1 * | 7/2010 | Oosting | 700/279 |
| 2012/0279486 A1 * | 11/2012 | Sakai et al. | 126/600 |
| 2013/0037082 A1 * | 2/2013 | Grant | 136/246 |
| 2013/0276864 A1 * | 10/2013 | Neber et al. | 136/246 |

\* cited by examiner

US 8,735,713 B2

SUN-CHASING DEVICE

CROSS-REFERENCES TO RELATED APPLICATIONS

This application claims under 35 U.S.C. §119(a) the benefit of Taiwanese Application No. 101117188, filed May 15, 2012, the entire contents of which is incorporated herein by reference.

BACKGROUND OF THE INVENTION

1. Field of Invention

The present invention relates to sun-chasing devices, and, more particularly, to a sun-chasing device for a solar apparatus.

2. Description of Related Art

Nowadays, energy consumption gets increasing. However, fossil energy (such as petroleum, natural gas and coal) is limited on earth, and usage of fossil energy would result in greenhouse effect and abnormal climates. Thus, it is an urgent issue to develop alternative energy.

Currently, solar energy is an important alternative energy. Due to the improvement of semiconductor technology, the energy conversion efficiency of a solar module is greatly increased. However, a solar plate fails to effectively receive solar energy while the angle of sunlight changes. Therefore, sun-chasing devices are developed for a solar module, such that a solar plate can chase sunlight and absorb more solar energy. For example, Taiwanese Patent No. 1340226, Taiwanese Patent No. M346679 and U.S. Pat. No. 6,005,236 disclose such sun-chasing devices.

However, the conventional sun-chasing device has a supporting component connected to a solar module and the ground, such that the solar module is supported by the supporting component. The whole configuration is not rigid enough to be used in an area with strong wind, such that the solar plate has poor precision of the sun-chasing function and low energy conversion efficiency.

Moreover, the conventional sun-chasing devices have too small the rotation angles, such that it is hard for solar plates to aim at the sun, and thus the efficiency of solar modules is poor.

Accordingly, there is a need to develop a sun-chasing device having a rigid structure, great precision and improved rotation angles.

SUMMARY OF THE INVENTION

The present invention provides a sun-chasing device. The sun-chasing device includes a base; a first transmitter disposed on the base and having a first transmission direction; a second transmitter disposed on the base and having a second transmission direction perpendicular to the first transmission direction; a support disposed on the base and at an intersection of a first line extending along the first transmission direction of the first transmitter and a second line extending along the second transmission direction of the second transmitter; a first supporting component having a first end pivotally connected to the first transmitter; a second supporting component having a third end pivotally connected to the second transmitter; and a carrier pivotally connected to the support and having a first side facing the first transmission direction of the first transmitter and near the first end of the first supporting component, a second side distant from the first end of the first supporting component, a third side facing the second transmission direction of the second transmitter and near the third end of the second supporting component, and a fourth side distant from the third end of the second supporting component, wherein the second side is pivotally connected to a second end of the first supporting component, and the third side is pivotally connected to a fourth end of the second supporting component via a shifting component.

In accordance with the present invention, the first transmitter further includes a first power unit, and the second transmitter further includes a second power unit. The first power unit and the second power unit are used for driving the first transmitter and the second transmitter, respectively.

In accordance with the present invention, the sun-chasing device further includes a control unit electrically connected to the first power unit and the second power unit for controlling the first transmitter and the second transmitter, so as to drive the first supporting component and the second supporting component, respectively, and further drive the carrier to chase sun automatically.

In comparison with the prior art, the sun-chasing device of the present invention has a parallel mechanism and thus has high rigidity and carrying ability against strong wind. Moreover, the sun-chasing device of the present invention further has great chasing precision and increased rotation angles, such that a solar plate can aim at sun precisely for long time so as to significantly improve the efficiency of a solar module.

DETAILED DESCRIPTION OF THE PREFERRED EMBODIMENTS

The following specific examples are used for illustrating the present invention. A person skilled in the art can easily conceive the other advantages and effects of the present invention.

Figure 1:
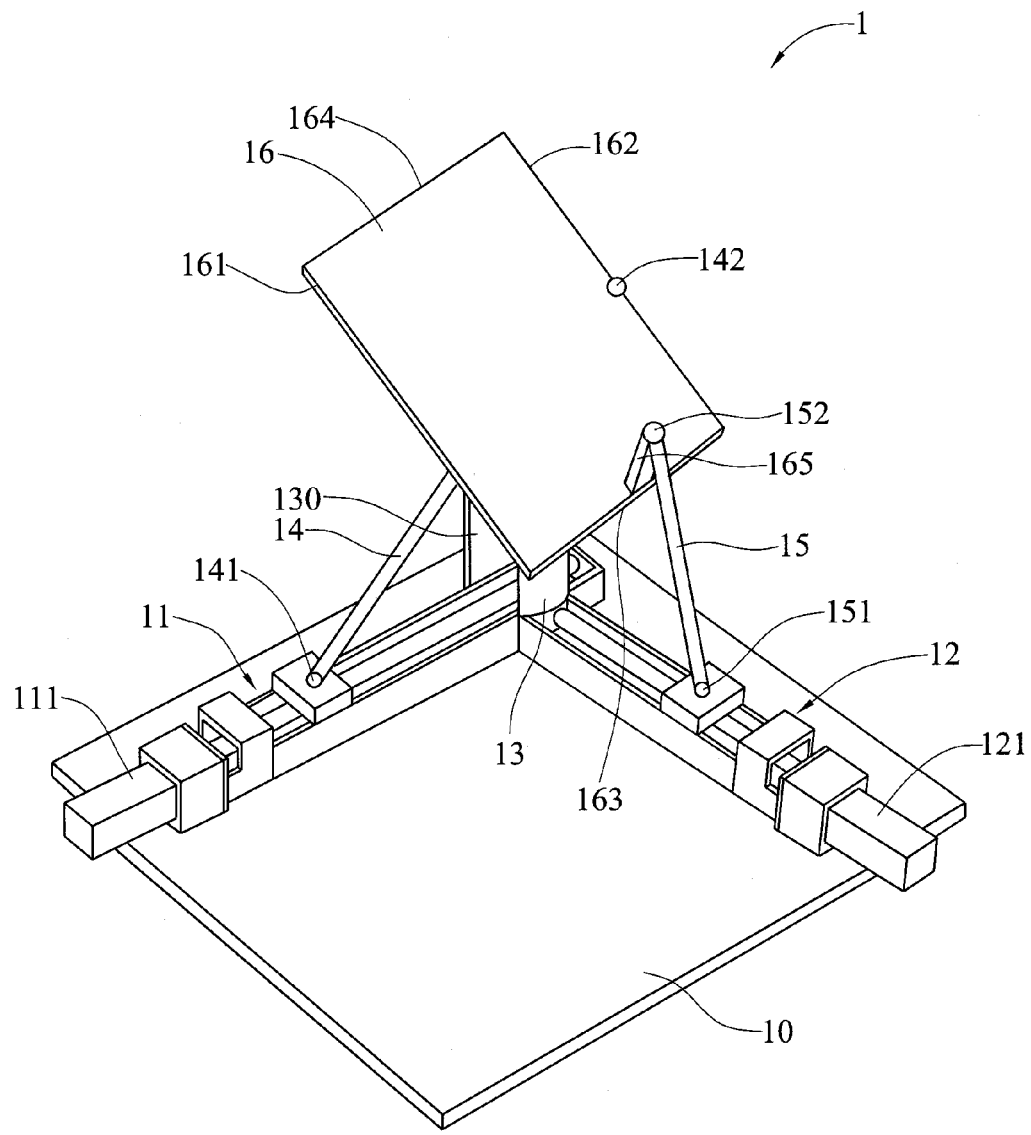
FIG. 1 is a schematic view showing a sun-chasing device according to an embodiment of the present invention.

FIG. 1 is a schematic view showing a sun-chasing device 1 according to an embodiment of the present invention. The sun-chasing device 1 includes a base 10, a first transmitter 11, a second transmitter 12, a support 13, a supporting component 14, a second supporting component 15 and a carrier 16.

The first transmitter 11 and the second transmitter 12 are disposed on the base 10, and a second transmission direction of the second transmitter 12 is perpendicular to a first transmission direction of the first transmitter 11.

In an embodiment of the present invention, the first transmitter 11 further includes a first power unit 111, the second transmitter 12 further includes a second power unit 121, and the first power unit 111 and the second power unit 121 may be servo motors, stepper motors or linear motors used for driving the first transmitter 11 and the second transmitter 12, respectively.

In another embodiment of the present invention, the first transmission direction of the first transmitter 11 is an east-west direction, and the second transmission direction of the second transmitter 12 is a south-north direction (the east-west direction and the south-north direction are determined based on the directions of sun set and sun rise).

In another embodiment of the present invention, the first transmitter 11 and the second transmitter 12 may be a combination of a screw guiding component and a sliding block, a screw guiding component and a sliding sleeve or a belt, a gear disc and a sliding block.

The support 13 is disposed at an intersection of a first line extending along the first transmission direction of the first transmitter 11 and a second line extending along the second transmission direction of the second transmitter 12.

The first supporting component 14 has a first end 141 and a second end 142, and the first end 141 is pivotally connected (pivotal connection) to the first transmitter 11.

The second supporting component 15 has a third end 151 and a fourth end 152, and the third end 151 is pivotally connected to the second transmitter 12.

The carrier 16 is pivotally connected to the support 13 and has a first side 161 facing the transmission direction of the first transmitter 11 and near the first end 141 of the first supporting component 14, a second side 162 distant from the first end 141 of the first supporting component 14, a third side 163 facing the transmission direction of the second transmitter 12 and near the third end 151 of the second supporting component 15, and a fourth side 164 distant from the third end 151 of the second supporting component 15. The second side 162 is pivotally connected to the second end 142 of the first supporting component 14, and the third side 163 is pivotally connected to the fourth end 152 of the second supporting component 15 via a shifting component 165.

In another embodiment of the present invention, the support 13 has an opening 130, allowing the first supporting component 14 to pass therethrough and be pivotally connected to the second side 162 of the carrier 16.

In another embodiment of the present invention, a ball adapter, a travel adapter, a rotation adapter, an assembly adapter or a combination thereof is used for the pivotal connection.

Figure 2:
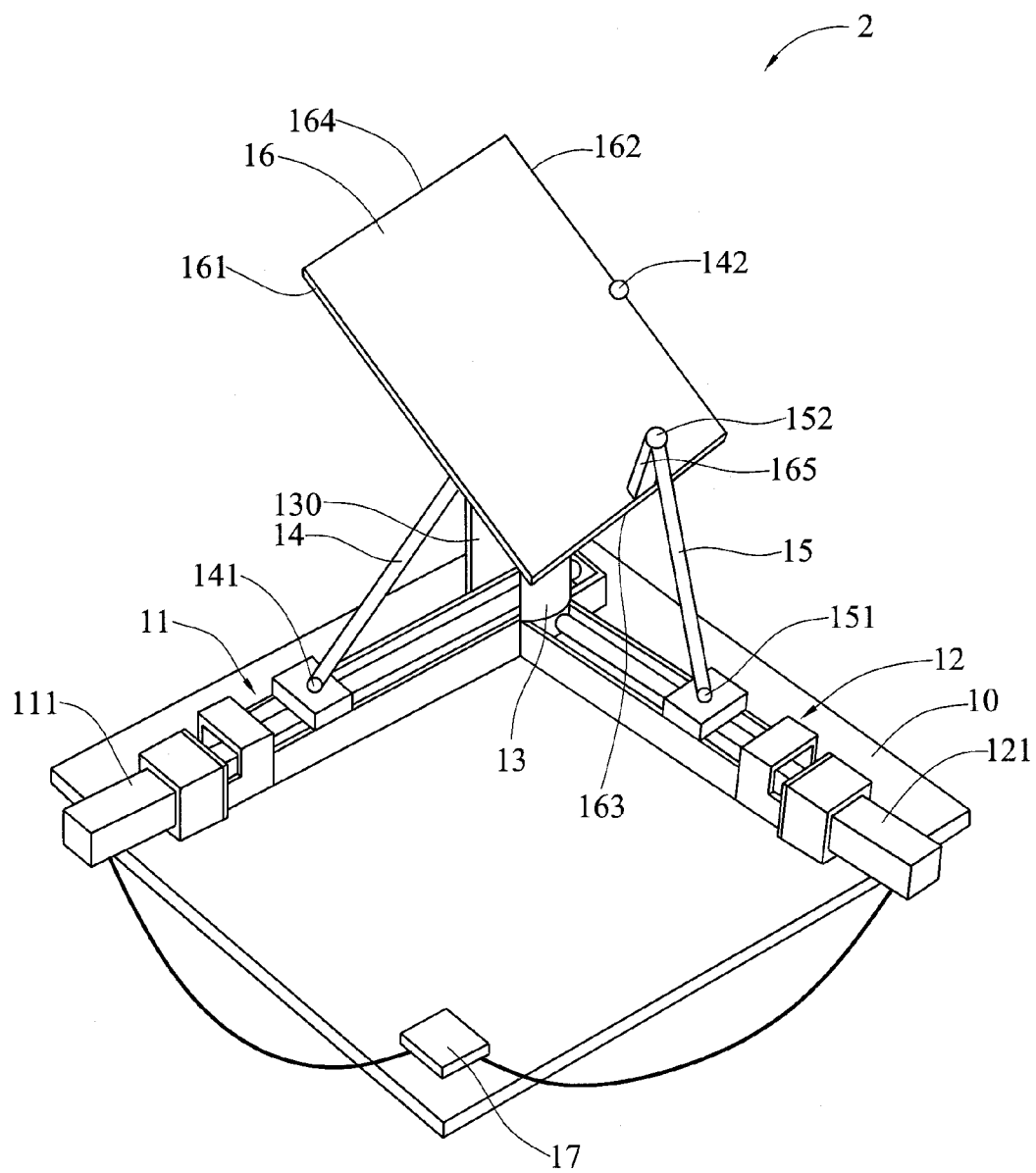
FIG. 2 is a schematic view showing a sun-chasing device according to another embodiment of the present invention.

FIG. 2 is a schematic view showing a sun-chasing device according to another embodiment of the present invention. The sun-chasing device 2 differs from the sun-chasing device 1 in that the sun-chasing device 2 further includes a control unit 17 electrically connected to a first power unit 111 and a second power unit 121 for controlling the first transmitter 11 and the second transmitter 12, respectively, so as to drive the first supporting component 14 and the second supporting component 15, respectively, and further drive the carrier 16 to chase sun automatically.

In an embodiment of the present invention, the control unit 17 may be a microprocessor.

Figure 3A:
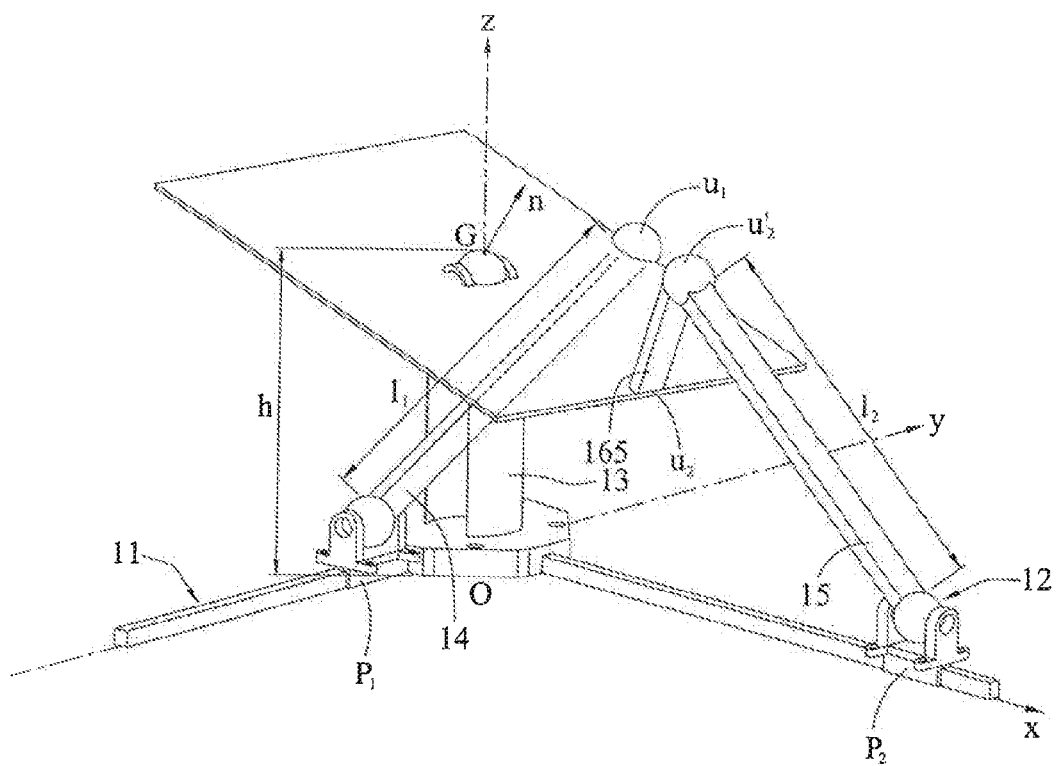
FIG. 3A to FIG. 3C are schematic views showing the operation of the sun-chasing device according to the present invention.

FIG. 3A is a schematic view showing the operation of the sun-chasing device according to the present invention. As shown in FIG. 3A, a first transmission direction of the first transmitter 11 is set as an east-west direction presented by a y-axis, and a second transmission direction of the second transmitter 12 is set as a south-north direction presented by an x-axis. The height h of the sun-chasing device is calculated from the origin of coordinate to the pivoting point G of the carrier 16 and the support 13. The carrier 16 and the first supporting component 14 are pivotally connected at the pivoting point $u_1$. The shifting component 165 and the carrier 16 are pivotally connected at the pivoting point $u_2$. The shifting component 165 and the second supporting component 15 are pivotally connected at the pivoting point $u'_2$. Further, the lengths of the first supporting component 14 and the second supporting component 15 are $l_1$ and $l_2$, respectively. In an embodiment, the first transmitter 11 and the second transmitter 12 are an assembly of a guiding screw component and a sliding block. Thus, the first supporting component 14 is pivotally connected to the sliding block $P_1$ in the first transmitter 11, and the second supporting component 15 is pivotally connected to the sliding block $P_2$ in the second transmitter 12. In the sun-chasing device according to the present invention, the direction which a solar module (not shown) on the carrier 16 is toward is determined by controlling the positions of the sliding blocks $P_1$ and $P_2$.

The normal vector of the carrier 16 is presented as a vector n having a direction toward sun. It is assumed that a vector $Gu_1$ only moves on a y-z plane. The sliding block P1 moves the carrier 16 while moving toward the y-axis such that the carrier 16 rotates around the center G in an anticlockwise direction and an east-west direction, wherein an angle $\alpha$ is the angle between the vector $Gu_1$ and the height h of the device. According to Pythagorean theorem, the control equation (1) of the sliding block $P_1$ is as follows:

$$|l_1|^2 = h'^2 + (p' + P_1)^2 \qquad (1)$$

where $$h' = h - |Gu_1| \cdot \cos(\alpha) \qquad (2)$$

and $$p' = |Gu_1| \cdot \sin(\alpha) \qquad (3)$$

The direction of the vector $Gu_1$ in the y-z plane is calculated. Since the vector $Gu_1$ only moves in the y-z plane, a cross product of the normal vector of the carrier 16 and the normal vector of the y-z plane is calculated to obtain the direction of the vector $Gu_1$ in the y-z plane. The cross product is divided by the length to obtain a unit vector $e_{Gu1}$. The unit vector $e_{Gu1}$ is multiplied by the length of the vector $Gu_1$, so as to obtain the vector $Gu_1$. Equation (4) is shown as follows:

$$Gu_1 = |Gu_1| \cdot \frac{n \times (1\ 0\ 0)}{|n \times (1\ 0\ 0)|} = |Gu_1| \cdot e_{Gu1} \qquad (4)$$

Then, a vector $Gu_2$ is calculated. The normal vector n of the carrier 16, the vector $Gu_1$ and the vector $Gu_2$ are perpendicular to each other. A cross product of the vector $Gu_1$ and the normal vector n of the carrier 16 is calculated to obtain the direction of the vector $Gu_2$. The cross product is divided by the length to obtain a unit vector $e_{Gu2}$. The unit vector $e_{Gu2}$ is multiplied by the length of the vector $Gu_2$, so as to obtain the vector $Gu_2$. Equation (5) is shown as follows:

$$Gu_2 = |Gu_2| \cdot \frac{Gu_1 \times n}{|Gu_1 \times n|} = |Gu_2| \cdot e_{Gu2} \qquad (5)$$

Further, the second supporting component 15 is pivotally connected to the shifting component 165, such that the vector $Gu_2$ needs to be added with a length of a movement as follows.

$$Gu'_2 = Gu_2 + u_2 u'_2 \qquad (6)$$

Equation (6) is combined with equations (7) and (8) which show the position of the sliding block $P_2$ and the position vector of the supporting component 15, respectively.

$$OP_2 = P_2 (1\ 0\ 0) \qquad (7)$$

$$l_2 = Ou'_2 - OP_2 \qquad (8)$$

According to law of cosines, equation (9) is obtained as follows:

$$h^2 + P_2^2 = |Gu'_2|^2 + |l_2|^2 - Gu'_2 \cdot l_2 \qquad (9)$$

Equation (9) can be presented as follows:

$$P_2^2 + BP_2 + C = 0 \quad (10)$$

In equation (10), $$B = -2(Gu'_{2,x}), \text{ and}$$

$$C = h^2 - |Gu'_2|^2 - |l_2|^2 + 2(Gu'_{2,x} \cdot Ou'_{2,x} + Gu'_{2,y} \cdot Ou'_{2,y} + Gu'_{2,z} \cdot Ou'_{2,z})$$

Hence, the control equation (11) for the sliding block $P_2$ is as follows:

$$P_2 = \frac{-B \pm \sqrt{B^2 - 4C}}{2} \quad (11)$$

Figure 3B:
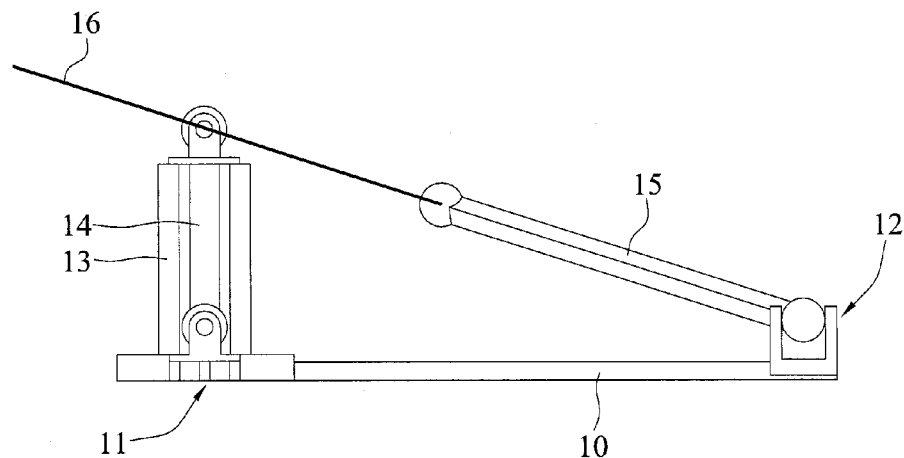
Figure 3C:
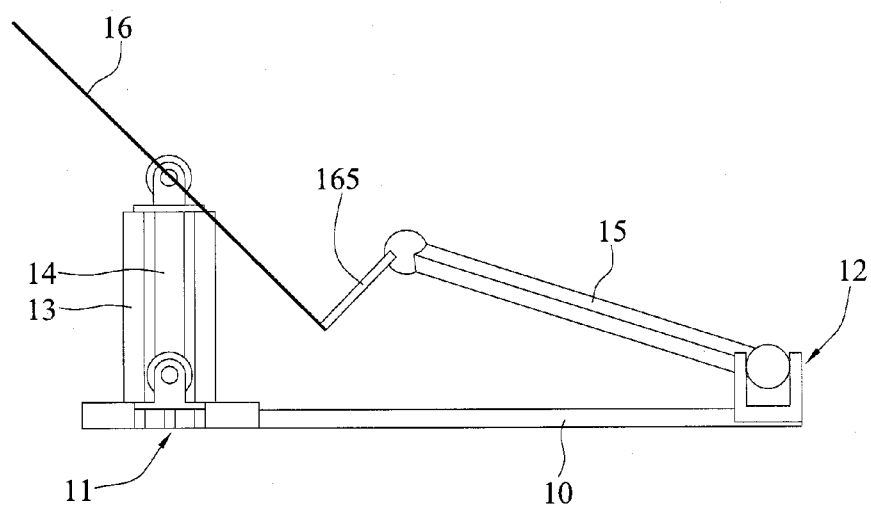

In an embodiment, the shifting component 165 is used for increasing the rotation angle of the carrier 16 rotating in a south-north direction, so as to prevent the sun-chasing device of the present invention from getting stuck at a certain position. Therefore, the sun-chasing device of the present invention can precisely aim at sun even at winter solstice. As shown in FIG. 3B, the rotation of the sun-chasing device achieves the extreme elevation angle, which is about 67.03 degrees. Practically, at winter solstice, the elevation angle for aiming at sun needs to be 41.77 degrees. Hence, the shifting component 165 can increase the rotation angle of the carrier 16, so as to extent the solar module to receive sun light (as shown in FIG. 3C).

Accordingly, the sun-chasing device of the present invention has a parallel mechanism design and thus has great rigidity and carrying ability against strong wind. Furthermore, the sun-chasing device according to the present invention has smaller error accumulation, and thus has great precision and energy conversion efficiency.

In addition, the sun-chasing device of the present invention has a shifting component for increasing the rotation angle of the carrier so as to prevent the sun-chasing device from having too small rotation angle and failing to aim at sun.

The invention has been described using exemplary preferred embodiments. However, it is to be understood that the scope of the invention is not limited to the disclosed arrangements. The scope of the claims, therefore, should be accorded the broadest interpretation, so as to encompass all such modifications and similar arrangements.

What is claimed is:

1. A sun-chasing device, comprising:
a base;
a first transmitter disposed on the base and having a first transmission direction;
a second transmitter disposed on the base and having a second transmission direction perpendicular to the first transmission direction;
a support disposed at an intersection of a first line extending along the first transmission direction of the first transmitter and a second line extending along the second transmission direction of the second transmitter;
a first supporting component having a first end pivotally connected to the first transmitter for being translated along the first transmission direction;
a second supporting component having a third end pivotally connected to the second transmitter for being translated along the second transmission direction; and
a carrier pivotally connected to the support and having a first side facing the first transmission direction of the first transmitter and near the first end of the first supporting component, a second side distant from the first end of the first supporting component, a third side facing the second transmission direction of the second transmitter and near the third end of the second supporting component, and a fourth side distant from the third end of the second supporting component, wherein the second side is pivotally connected to a second end of the first supporting component, and the third side is pivotally connected to a fourth end of the second supporting component via a shifting component, wherein as the first and second supporting components move along the first and second transmitters respectively, the angle of the carrier is adjusted.

2. The sun-chasing device of claim 1, wherein the first transmission direction of the first transmitter is an east-west direction, and the second transmission direction of the second transmitter is a south-north direction.

3. The sun-chasing device of claim 1, wherein the first transmitter and the second transmitter each comprise a screw guiding component and a sliding block, a screw guiding component and a sliding sleeve, or a belt, a gear disc and a sliding block.

4. The sun-chasing device of claim 1, wherein the first transmitter further includes a first power unit, the second transmitter further includes a second power unit, and the first power unit and the second power unit are used for driving the first transmitter and the second transmitter, respectively.

5. The sun-chasing device of claim 4, wherein the first power unit and the second power unit are servo motors, stepper motors or linear motors.

6. The sun-chasing device of claim 1, wherein the carrier is pivotally connected to the support through a ball adapter, a travel adapter, a rotation adapter, an assembly adapter or a combination thereof.

7. The sun-chasing device of claim 1, further comprising a control unit electrically connected to the first power unit and the second power unit for controlling the first transmitter and the second transmitter to drive the first supporting component and the second supporting component, respectively, and thus to drive the carrier to chase sun automatically.

\* \* \* \* \*